US012614421B2

(12) United States Patent　　　　　(10) Patent No.:　US 12,614,421 B2
Briskey et al.　　　　　　　　　　　(45) Date of Patent:　　Apr. 28, 2026

(54) TRANSLATOR FOR ACCESS TO SMART LOCKS

(71) Applicant: Honeywell International Inc., Charlotte, NC (US)

(72) Inventors: Teri L. Briskey, Monmouth, OR (US); Adam Kuenzi, Silverton, OR (US); Aswin S. Nair, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/761,263

(22) Filed: Jul. 1, 2024

(65) Prior Publication Data
US 2024/0355157 A1　Oct. 24, 2024

Related U.S. Application Data

(63) Continuation of application No. 17/650,910, filed on Feb. 14, 2022, now Pat. No. 12,051,291.

(Continued)

(51) Int. Cl.
*G07C 9/00*　　　(2020.01)
*G06F 3/16*　　　(2006.01)
(Continued)

(52) U.S. Cl.
CPC ......... *G07C 9/00309* (2013.01); *G06F 3/165* (2013.01); *G07C 9/00571* (2013.01);
(Continued)

(58) Field of Classification Search
None
See application file for complete search history.

(56) References Cited

U.S. PATENT DOCUMENTS 9,438,585 B2　9/2016　Kuenzi et al.
10,397,013 B1 *　8/2019　Hill ...................... H04L 12/281
(Continued)

FOREIGN PATENT DOCUMENTS

EP　　3136273 A1　3/2017
EP　　3503057 A1　6/2019
WO　2014031399 A1　2/2014

OTHER PUBLICATIONS

EP Application No. 22157239.9, European Search Report, dated Jul. 13, 2022. (10 pages).

*Primary Examiner* — K. Wong
(74) *Attorney, Agent, or Firm* — Seager, Tufte & Wickhem, LLP

(57) ABSTRACT

A wireless translator and a method for controlling a locking device using a wireless translator are provided. The wireless translator includes a wireless receiver configured to receive at least one wireless signal from a mobile device, and a processor connected to the wireless receiver. The wireless translator includes a memory system including one or more computer-readable media that include instructions that, when executed by the processor, causes the wireless translator to perform the following operations: (i) receiving access credentials and a lock command for the locking device from the mobile device via a first wireless signal; (ii) verifying the access credentials; and (iv) transmitting the lock command to the home automation system via a second wireless signal, the home automation system paired with the locking device, the home automation system configured to transmit the lock command to the locking device via a third wireless signal.

20 Claims, 2 Drawing Sheets

Related U.S. Application Data

(60) Provisional application No. 63/200,140, filed on Feb. 17, 2021.

(51) Int. Cl.

| | | |
|---|---|---|
| *H04L 12/28* | (2006.01) | |
| *H04R 1/02* | (2006.01) | |
| *H04R 3/00* | (2006.01) | |

(52) U.S. Cl.
CPC ......... *H04L 12/2803* (2013.01); *H04R 1/028* (2013.01); *H04R 3/00* (2013.01); *H04L 2012/2841* (2013.01); *H04R 2420/07* (2013.01)

(56) References Cited

U.S. PATENT DOCUMENTS

| | | | |
|---|---|---|---|
| 10,573,106 | B1 | 2/2020 | Brady et al. |
| 10,666,453 | B2 | 5/2020 | Kim et al. |
| 10,833,912 | B2 | 11/2020 | Au et al. |
| 11,250,654 | B2 | 2/2022 | Kanteti et al. |
| 2015/0159401 | A1 | 6/2015 | Patrick et al. |
| 2016/0044447 | A1 | 2/2016 | Tetreault et al. |
| 2018/0283051 | A1 | 10/2018 | Qiu et al. |
| 2019/0394858 | A1 | 12/2019 | Lal |

* cited by examiner

800

RECEIVING ACCESS CREDENTIALS
AND LOCK COMMAND FROM
MOBILE DEVICE AT WIRELESS
TRANSLATOR ⏤ 810

ACCESS
CREDENTIALS
VALID ⏤ 820

NO

YES

TRANSMITTING LOCK COMMAND
FROM WIRELESS TRANSLATOR TO
HOME AUTOMATION SYSTEM ⏤ 830

TRANSMITTING LOCK COMMAND
FROM HOME AUTOMATION TO
LOCKING DEVICE ⏤ 840

TRANSLATOR FOR ACCESS TO SMART LOCKS

CROSS REFERENCE TO A RELATED APPLICATION

The application is a continuation of U.S. patent application Ser. No. 17/650,910, filed Feb. 14, 2022, which claims the benefit of U.S. Provisional Application No. 63/200,140 filed Feb. 17, 2021, each titled TRANSLATOR FOR ACCESS TO SMART LOCKS, the contents of which are hereby incorporated in their entirety.

BACKGROUND

This invention relates to access control devices. More particularly, the invention relates to the use of a translator to unlock a locking device (e.g., a smart lock, which may be installed on the front door to a home).

Access control devices (e.g., access control readers, lockboxes, etc.) can be used to control various types of protected environments. For example, lockboxes can be used to control access to one or more items inside the lockbox (e.g., a key to the front door of a home). Lockboxes, sometimes referred to as "keyboxes", are commonly used in the real estate industry. These lockboxes are commonly placed on a doorknob or porch of a house listed for sale. These lockboxes are used to protect a key for a door to the house (e.g., by storing the key within the lockbox). These lockboxes allow a real estate agent to access and show a house when the owner is unavailable. However, more and more homeowners are beginning to install and utilize smart locks to secure the front door to their house, which may affect the way real estate agents gain access.

A smart lock is an electromechanical lock that is designed to lock/unlock when it receives instructions (via a wireless signal) from an authorized device (e.g., a mobile device, such as a smartphone). Many of these smart locks still retain the ability of being unlocked with a traditional key, but there are some newly developed smart locks that do not include a keyhole and as such are not able to be unlocked with a traditional key. As such, this presents a potential problem for the real estate market as the traditional means of accessing the house (i.e., using a lockbox to obtain a key to unlock the front door of the home) will not be viable for smart locks that do not include a keyhole. Additionally, since there are a variety of different smart locks on the market, each of which may include their own mobile app and/or communication protocols, it is increasingly difficult for real estate agents to obtain access to homes with smart locks when the homeowner is unavailable. This is largely due to the fact that today there are only apps that integrate on a one-to-one relationship with particular smart locks (i.e., there does not appear to be one mobile app that can provide authorized access credentials across multiple smart lock platforms). Although many of these smart locks are capable of being integrated with Alexa or Google, nothing allows a service provider (e.g., a real estate agent, delivery person, or home cleaner) to use one mobile app to access smart locks from multiple different manufacturers.

Accordingly, there remains a need for an invention that makes it possible for services providers to obtain access to smart locks from multiple, different manufacturers.

BRIEF DESCRIPTION

According to one embodiment a wireless translator capable of communicating with a home automation system to control a locking device is provided. The wireless translator includes a wireless receiver, a process, and a memory system. The wireless receiver is configured to receive at least one wireless signal from a mobile device. The processor is connected to the wireless receiver. The memory system includes one or more computer-readable media. The computer-readable media include instructions that, when executed by the processor, cause the wireless translator to perform operations including: (i) receiving access credentials and a lock command for the locking device from the mobile device via a first wireless signal; (ii) verifying the access credentials; and (iii) transmitting the lock command to the home automation system via a second wireless signal, the home automation system paired with the locking device, the home automation system configured to transmit the lock command to the locking device via a third wireless signal.

In accordance with additional or alternative embodiments, the wireless translator is separate from the locking device and the home automation device, and located remotely from the locking device and the home automation device.

In accordance with additional or alternative embodiments, the first wireless signal is transmitted using at least one of: Bluetooth, Bluetooth Low Energy (BLE) and infrared.

In accordance with additional or alternative embodiments, at least one of the second wireless signal and the third wireless signal are transmitted over at least one of: a wireless personal area network (WPAN), Wi-Fi, Zigbee, LoRaWAN, 5G, Cellular, Sub-gigahertz, and ultra-wideband.

In accordance with additional or alternative embodiments, the second wireless signal is an audio voice recording, the audio voice recording being stored on the memory system.

In accordance with additional or alternative embodiments, the wireless translator further includes at least one speaker operably connected to the processor, the processor configured to cause the audio voice recording to be audibly transmitted via the at least one speaker when the access credentials are verified.

In accordance with additional or alternative embodiments, the locking device is configured to actuate from a locked position to an unlocked position in response to receiving the lock command.

In accordance with additional or alternative embodiments, the home automation system is further paired with an alarm panel, the home automation system configured to transmit a deactivation signal to the alarm panel via a fourth wireless signal in response to receiving the lock command.

In accordance with additional or alternative embodiments, the alarm panel is configured to switch from an activated mode to a deactivated mode in response to receiving the deactivation signal.

In accordance with additional or alternative embodiments, the fourth wireless signal is transmitted over at least one of: a wireless personal area network (WPAN), Wi-Fi, Zigbee, LoRaWAN, 5G, Cellular, Sub-gigahertz, and ultra-wideband.

In accordance with additional or alternative embodiments, the wireless translator further includes a compartment for storing a key to the locking device, the compartment operably coupled with a lock actuator, the lock actuator operably coupled with the processor, the lock actuator configured to release the compartment when the access credentials are verified.

In accordance with additional or alternative embodiments, the wireless translator is devoid of a compartment for storing a key to the locking device.

According to another aspect of the disclosure, a method for controlling a locking device using a wireless translator is provided. The wireless translator is capable of communicating with a home automation system to control the locking device. The method includes a step for receiving, at a wireless receiver of the wireless translator, access credentials and a lock command for the locking device from the mobile device via a first wireless signal. The method includes a step for verifying the access credentials in a processor of the wireless translator. The method includes a step for transmitting a lock command from the wireless translator to the home automation system via a second wireless signal, the home automation system paired with the locking device. The method includes a step for transmitting the lock command from the home automation system to the locking device via a third wireless signal.

In accordance with additional or alternative embodiments, the wireless translator is separate from the locking device and the home automation device, and located remotely from the locking device and the home automation device In accordance with additional or alternative embodiments, the second wireless signal is an audio voice recording, the audio voice recording being stored on a memory system of the wireless transmitter, the processor configured to cause the audio voice recording to be audibly transmitted via at least one speaker of the wireless translator when the access credentials are verified.

In accordance with additional or alternative embodiments, the locking device is configured to actuate from a locked position to an unlocked position in response to receiving the lock command.

In accordance with additional or alternative embodiments, the home automation system is further paired with an alarm panel, the home automation system configured to transmit a deactivation signal to the alarm panel via a fourth wireless signal in response to receiving the lock command.

In accordance with additional or alternative embodiments, the method further includes a step for releasing a compartment for storing a key to the locking device, the compartment operably coupled with a lock actuator, the lock actuator operably coupled with the processor, the lock actuator configured to release the compartment when the access credentials are verified.

In accordance with additional or alternative embodiments, the first wireless signal is transmitted using at least one of: Bluetooth, Bluetooth Low Energy (BLE) and infrared.

In accordance with additional or alternative embodiments, at least one of the second wireless signal, the third wireless signal, and the fourth wireless signal are transmitted over at least one of: a wireless personal area network (WPAN), Wi-Fi, Zigbee, LoRaWAN, 5G, Cellular, Sub-gigahertz, and ultra-wideband.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

As will be described below, the wireless translator makes it possible for services providers (e.g., real estate agents, delivery persons, or home cleaners, etc.) to obtain access to smart locks from multiple, different manufacturers in a similar manner as previously-provided, traditional lockboxes, which include a compartment for housing a key to the front door of the home. It should be appreciated that smart locks that still retain the ability to be unlocked with a traditional key may still be accessible to service providers, etc. through use of a traditional lockbox (i.e., a lockbox that does not include the below-described functionality). It is envisioned that the wireless translator described below may take the place of the traditional lockbox and allow access to the home for service providers, such as real estate agents, when the homeowner is unavailable (especially when the smart lock does not include the ability of being unlocked with a traditional mechanical key or RFID card). As will be further described below, the access to the wireless translator (and therefore the home, etc.) may be managed by the local Real Estate Association (which may be described as a central authority). It should be appreciated that, like traditional lockboxes, each home may have their own individually-assigned lockbox, the cumulation of which may be managed by a local Real Estate Association (i.e., one local Real Estate Association may manage who has access to multiple lockboxes). Although described herein to be particularly useful for the real estate industry, it should be appreciated that the wireless translator described herein may be useful across a plethora of industries (e.g., real estate, home delivery, home cleaners, vacation/rental, etc.) or even traditional homeowner (who need to provide access to their properties without having to give out the actual access code to their smart lock.

Figure 1:
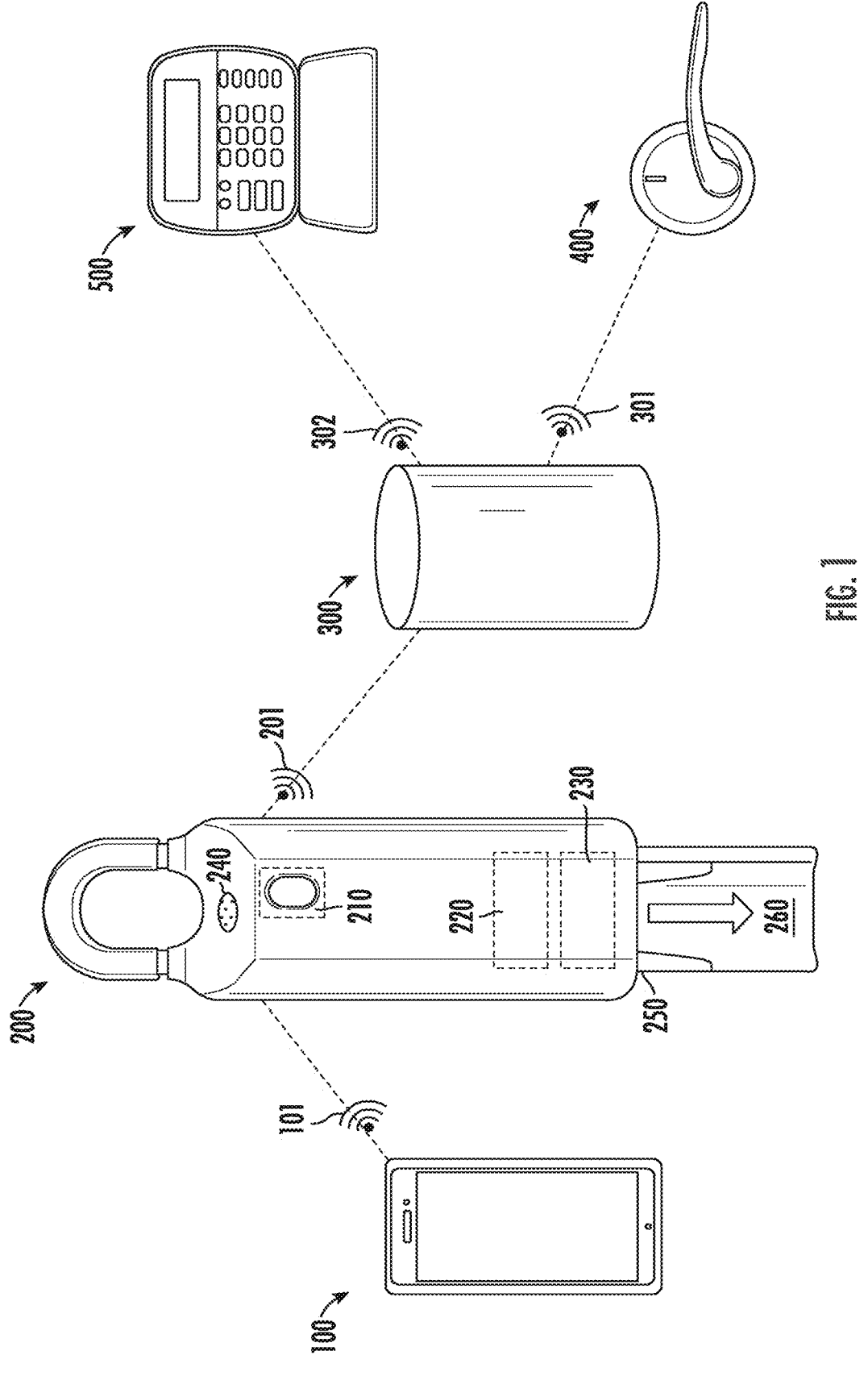
FIG. 1 is a schematic illustration of a wireless translator capable of communicating with a home automation system to control a locking device in accordance with one aspect of the disclosure.

With reference now to the Figures, a schematic illustration of a wireless translator 200 capable of communicating with a home automation system 300 to control a locking device 400 is shown in FIG. 1. As shown in FIG. 1, the wireless translator 200 includes a receiver 210, a processor 220, and a memory system 230. The receiver 210 is configured to receive at least one wireless signal from a mobile device 100. The processor 220 is connected to the wireless receiver 210. The memory system 230 includes one or more computer-readable media, which include instructions that, when executed by the processor 220, cause the wireless translator 200 to perform the below-described operations. These operations include the following: (i) receiving access credentials and a lock command for the locking device 400 from the mobile device 100 via a first wireless signal 101; (ii) verifying the access credentials; and (iii) transmitting the lock command to the home automation system 300 via a second wireless signal 201, the home automation system 300 is paired with the locking device 400, the home automation system 300 is configured to transmit the lock command to the locking device 400 via a third wireless signal 301 when receiving the lock command from the wireless translator 200.

Although the lock command (i.e., the data) that is sent from the translator 200 to the home automation system 300 and the lock command (i.e., the data) that is send from the home automation system 300 to the locking device 400 may be the same (e.g., in the same form, etc.) in certain instances, the lock command(s) (i.e., the data) may be different (e.g., in different forms, etc.) in other instances. For example, the lock command from the translator 200 to the home automation system 300 may be in one form, and the lock command from the home automation system 300 to the locking device 400 may be in a different form (i.e., the data may be differently configured between the different steps of the journey). Regardless of the form of the lock command, it should be appreciated that the lock command from the home automation system 300 may cause the locking device 400 to actuate from a locked position to an unlocked position (which may enable a service provider, etc. the ability to enter the home). Although any suitable wireless technology may be utilized, in certain instances, the first wireless signal is transmitted using at least one of: Bluetooth, Bluetooth Low Energy (BTLE), and infrared from the mobile device 100, and at least one of the second wireless signal and the third wireless signal are transmitted over at least one of: a wireless personal area network (WPAN), Wi-Fi, Zigbee, LoRaWAN, 5G, Cellular, Sub-gigahertz, Ultrawide band, or any other suitable wireless transmission technology. It should be appreciated that the mobile device 100 may be able to communicate with the wireless translator 200 even if the mobile device 100 is out of cellular coverage (e.g., the mobile device 100 may locally store access credentials and may not rely on cellular communication to transmit the first wireless signal) in certain instances.

It should be appreciated that the wireless translator 200 may include any suitable hardware to execute the above-described functionality. As mentioned above, the wireless translator 200 may include a wireless receiver 210 (e.g., provided to receive at least one wireless signal such as the first wireless signal 101), which may be configured as any suitable antenna capable of receiving wireless signals. The processor 220 (e.g., provided to execute instructions, process incoming wireless signals, and/or initiate the action(s) of other components of the wireless translator 200) may be configured as a single-processor or multi-processor system of any of a wide array of possible architectures, including, but not limited to, field programmable gate array (FPGA), a central processing unit (CPU), application specific integrated circuits (ASIC), digital signal processor (DSP) or graphics processing unit (GPU) hardware arranged homogenously or heterogeneously. The memory system 230 (e.g., provided for storing one or more computer-readable media including instructions to be executed by the processor 220) may be provided as a hard disk, a random access memory (RAM), a read-only memory (ROM), an erasable programmable read-only memory (EPROM or Flash Memory), a static random access memory (SRAM), a portable compact disc read-only memory (CD-ROM), a digital versatile disk (DVD), a memory stick, and/or any suitable combination of the foregoing. In certain instances the memory system 230 may be used to locally store a lock command (or information necessary to transmit a lock command to one or more locking device(s) 400). It should be appreciated that the wireless receiver 210 may also function as a transmitter (e.g., to transmit the second wireless signal 201); however, the wireless translator 200 may include an independent transmitter (not shown) in certain instances. This independent transmitter, when included, may be provided as any suitable antenna capable of transmitting wireless signals (e.g., to one or more home automation systems 300).

It is envisioned that the wireless transmitter 200 may be capable of seamlessly working with a mobile device 100. The mobile device 100 may, in certain instances, be viewed as a smart phone, such as those running the Android™ operating system of Google Inc., of Mountain View, Calif., or the iOS™ operating system of Apple Inc., of Cupertino, Calif., or the BlackBerry™ operating system of BlackBerry Limited, of Waterloo, Ontario. The mobile device 100 may be programmed with an application (e.g., an access app) that allows it to communicate wirelessly with the wireless translator 200. For example, the mobile device 100 and the wireless translator 200 may include transceivers and associated circuitry to enable infrared (IR) or other form of optical or radiofrequency (RF) (e.g., Bluetooth™ (certification mark of Bluetooth SIG, Inc., Kirkland, Wash.) or near field communication (NFC)) communication when within proximity of each other. One suitable infrared communication protocol is the IrDa™ (Infrared Data Association, Walnut Creek, Calif.) standard.

The application (e.g., which may allow for wireless communication between the wireless translator 200 and the mobile device 100) may be stored in the memory of the mobile device 100. It is envisioned that the transmission of the access credentials and the lock command (i.e., the first wireless signal 101) may be a manual process in certain instances. For example, the wireless translator 200 may require the user (i.e., a service provider, such as a real estate agent) to physically push a button (such as a compartment 260, or any other suitable button) on the wireless translator 200 to enable a Bluetooth feature. Additionally, the user's mobile device 100 (e.g., in the mobile app) may prompt the user to enter a PIN code for authentication before communicating to the wireless translator 200. Once the authentication is complete, the wireless translator 200 may automatically transmit the second wireless signal 201 to the home automation system 300. Conversely, in certain instances, the transmission of the access credentials and the lock command (i.e., the first wireless signal 101) may be an automatic process. For example, the mobile device 100 may be capable of automatically transmitting the first wireless signal 101 without necessitating the user physically interact with their mobile device 100 while at the wireless transmitter 200. While at the wireless translator 200 may be interpreted to mean that the user (e.g., the real estate agent, etc.) is present with their mobile device 100 and within Bluetooth signal range of the translator 200 and at a signal level deemed high enough to indicate they are present at the same location as the translator 200.

It is envisioned that the application stored in the memory of the mobile device 100 may enable the user (e.g., a real estate agent, service provider, renter, etc.) to unlock one or more locking device(s) 400 (e.g., by enabling communication with one or more wireless translator(s) 200). For example, the application stored in the memory of the mobile device 100 may be used to store access credentials locally on the mobile device 100 in certain instances. Additionally or alternatively, the application stored in the memory of the mobile device 100 may be used to enable the user to communicate with a central authority (e.g., to receive access credentials or a digital key for a given wireless translator 200). This central authority may be viewed as any authoritative body capable of controlling access to a given wireless translator 200. For example, a governing body for a multiple listing service. The central authority may administer the access privileges of users (e.g., real estate agents, service providers, renters, etc.) and the access preferences of individuals either owning or occupying the protected environment (e.g., owners of a home that is listed for sale or rent). The central authority may include one or more computers or servers with appropriate communications equipment to enable communication with the users and/or the individuals either owning or occupying the protected environment. These computers or servers individually or collectively may include appropriate processors, memory, or the like to execute programs to perform basic computer functions associated with the responsibilities of the central authority.

The central authority may include a database, which may store identifying information (e.g., telephone number(s) assigned to a user/individual, an address of a particular protected environment, status of the user/individual with the particular authoritative body, and any unique device identifiers for a particular mobile device 100, a particular wireless translator 200, and/or a particular beacon device (described below)). This database may pair particular identifying information together. For example, the database may store which unique device identifier, associated with a particular wireless translator 200, is being used to access a house with a particular address. It should be appreciated that this information may be updated from time to time by members/ employees of the central authority, users of the wireless translator 200 (e.g., real estate agents, homeowner, etc.), and/or individuals who either own or occupy the protected environment. For example, if a real estate agent remains in good standing with the governing body, they may continue to be given authorization to command wireless translators 200 (and/or open keyboxes) that are on homes for sale. But, if they fail to pay their dues or are no longer a licensed, valid real estate agent, or if their privilege has been revoked for some reason, their access credentials to the wireless translators 200 (and/or the keyboxes) may be removed. It should be appreciated that the removal on one user's access credentials (e.g., a real estate agent who is no longer licensed) may not affect the access credentials of other users (e.g., the homeowners and/or other still-valid real estate agents).

It is envisioned that pieces of various identifying information may be communicated to the mobile device 100 in order for the mobile device 100 to be able to access certain locking devices 200. For example, the mobile device 100 may receive access credentials from the central authority to be able to command and/or open certain wireless translators 200. As mentioned above, the wireless translator 200 may be viewed to take the place of the traditional lockboxes. As such, in certain instances, the wireless translators 200 may include similar components and/or features of traditional lockboxes. For example, as shown in FIG. 1, the wireless translator 200 may include a compartment 260 for storing a key to the locking device 400. This compartment 260 may be coupled with a lock actuator 250, which may be coupled with the processor 220, to cause the lock actuator 250 to release the compartment when the access credentials are verified (e.g., to gain access to a key inside the wireless translator 200 to be able to open a door to a home being sold). It is envisioned that in certain instances the wireless translator 200 is devoid of (i.e., does not have) a compartment 260 for storing a key to the locking device 400, which, as described below, may increase the security provided to the homeowner.

It should be appreciated that the wireless translator 200 described herein may provide not only increased accessibility to users (e.g., service providers, etc.) to access locking devices (i.e., smart locks) that do not have the ability to be unlocked with a key, but may also provide increased security (when compared to traditional lockboxes). This increased security may be provided by the removal of the key and/or compartment 260 from wireless translator 200 and/or the option of installing the wireless translator 200 inside the home (which makes the wireless translator 200 physically inaccessible). For example, with traditional lockboxes there is potential that a bad actor may steal and damage the lockbox in order to access the key to the home, which may enable the bad actor to unlock the door to the home (therefore presenting a potential security risk to the homeowner). By removing the compartment 260 (which traditionally stores a key) from the wireless translator 200 (which as described above may be viewed as a replacement for the traditional lockbox) and/or making it possible to install the wireless translator 200 inside the home this risk may be mitigated. It should be appreciated that the ability of the wireless translator 200 to be installed inside the home enabled by the fact that Bluetooth signals can propagate through walls (e.g., between the user's mobile device 100 located outside the home and the wireless translator 200 located inside the home). In addition to the above described security features, it is envisioned each wireless translator's 200 unique device identifier (e.g., consisting of a unique numeric or alphanumeric code) may be used to enable an audit record to be created and reported to the governing body and/or the homeowner (i.e., to show when a particular home was accessed). This audit record may additionally, optionally include unique device identifiers of mobile devices 100 that are used to access the home (i.e., to show who accessed the particular home).

The identifying information mentioned above may allow the mobile device 100 to transmit the correct access credentials to the correct wireless translator 200. For example, the mobile device 100 may receive identifying information, such as a unique device identifier (e.g., consisting of a unique numeric or alphanumeric code), for a particular wireless translator 200. It should be appreciated that at least portion of a unique device identifier may be transmitted between the wireless translator 200 and the mobile device 100 when communicating (e.g., the wireless translator 200 may transmit a portion of its own unique device identifier when transmitting an advertising signal, etc.). Receiving the advertising signal with the unique device identifier may prompt the mobile device 100 to transmit a particular access credential (e.g., associated with the particular wireless translator 200).

As mentioned above, once the verification of the access credentials is completed, the wireless translator 200 may transmit the second wireless signal 201 to the home automation system 300. It should be appreciated that the wireless translator 200 may be viewed as a separate piece of hardware from the locking device 400 and the home automation system 300 (i.e., located remotely from the locking device 400 and the home automation system 300). For example, similar to a traditional lockbox, the wireless translator 200 may be located at the front door of the home (or inside the home, as mentioned above). The home automation system 300 may, in certain instances, be viewed as the home automation systems 300 created by Google Inc. of Mountain View, Calif., which runs the Android™ operating system, or the home automation system 300 created by Apple Inc. of Cupertino, Calif., which runs the iOS™ operating system, or the home automation system 300 created by Amazon Inc. of Seattle Wash., which can run the iOS™ operating system and/or the Android™ operating system. As mentioned above, the home automation system 300 may be paired with the locking device 400 to enable the home automation system 300 to control the functionality (i.e. locking/unlocking) of the locking device 400. Similarly, the wireless translator 200 may be paired to the home automation system 300 to enable the wireless translator 200 to transmit the lock command to the home automation system 300. It should be appreciated that any suitable pairing technique may be utilized to pair the locking device with the home automation system 300.

In certain instances the wireless translator 200 may be viewed to be a proxy to the home automation system 300 (i.e., to enable approved users, such as service providers, to utilize the functionalities provided by the home automation system 300). It is envisioned that by having an intermediary device (access to which is controlled) access to multiple, different locking devices 400 manufactured by multiple different manufacturers can be given through one mobile app, similar to how lockboxes work today in the real estate market. Although described above to enable the unlocking of a locking device, it is envisioned that the wireless translator 200 may enable a user to control additional technologies (e.g., light fixtures, thermostats for an HVAC systems, etc.) that are paired with the home automation system 300. These additional technologies may be controlled through additional command signals (which may be initiated in a mobile device 100, transmitted through the wireless translator 200 to the home automation system 300, and from the home automation system 300 to the respective technology being controlled). For example, the home automation system 300 may be further paired with an alarm panel 500. In certain instances the home automation system 300 may be configured to transmit a deactivation signal to the alarm panel 500 via a fourth wireless signal 302 in response to receiving a lock command from the wireless translator 200. The alarm panel 500 may be configured to switch from an activated mode to a deactivate mode in response to receiving the deactivation signal. This may enable the user to enter the home without setting off the home alarm system. Similar to the second wireless signal and the third wireless signal, the fourth wireless signal may be transmitted over at least one of a wireless personal area network (WPAN), Wi-Fi, Zigbee, LoRaWAN, 5G, Cellular, Sub-gigahertz, Ultrawide band, or any other suitable wireless transmission technology in certain instances.

Although described above that the second wireless signal may be transmitted over at least one of the wireless transmission technologies mentioned above, in certain instances the second wireless signal may be an audible voice recording. This audible voice recording may be stored on the memory system 230 of the wireless translator 200. For example, the homeowner may pre-record their voice instructing their home automation system 300 to complete a certain task such as "unlock the front door". It is envisioned that the wireless translator 200 may be configured to transmit (via at least one speaker 240) the audible voice recording when the access credentials are verified by the processor 220. This audible command may be 'heard' and authenticated by the home automation system 300 to do the requested task (similar to how the home automation system 300 would process an audible command from a live person to do the requested task). For example, the home automation system 300 may verify the voice signature to authenticate that the speaker is authorized to command the home automation system 300 (e.g., verify that the voice is the homeowner's voice, etc.). It should be understood to a person of ordinary skill that the pre-recorded voice is not a synthesized voice in certain instances. It should be appreciated that the additional commands such as "deactivate alarm", "turn on lights", "set temperature of the home", etc. may be pre-recorded and configured to be transmitted (via at least one speaker 240) when the access credentials are verified (or when additional command signals are initiated in the mobile device 100).

Figure 2:
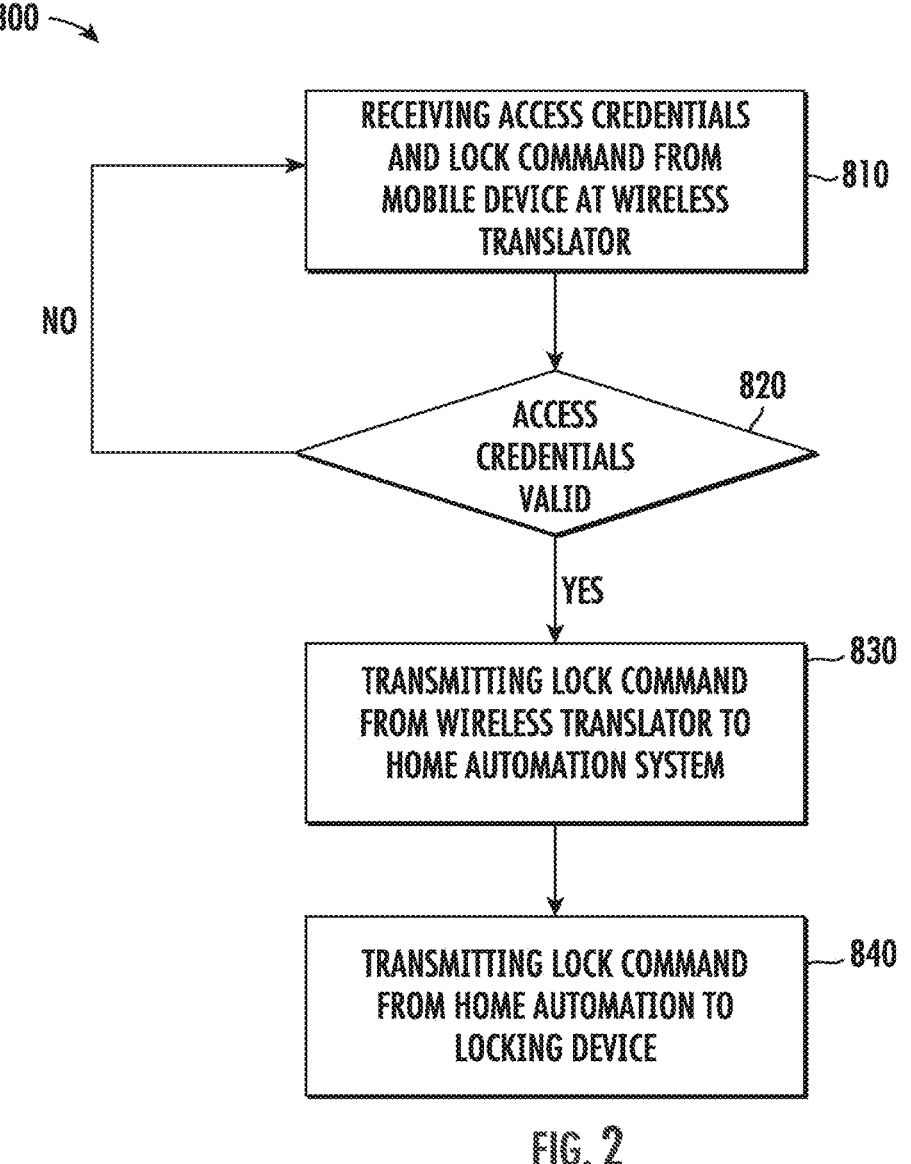
FIG. 2 is a flow diagram illustrating a method for controlling a locking device using a wireless translator, with the wireless translator communicating with a home automation system to control the locking device, in accordance with one aspect of the disclosure.

As mentioned above, the wireless translator 200 described herein may provide not only increased accessibility to users (e.g., service providers, etc.) to access locking devices (i.e., smart locks) that do not have the ability to be unlocked with a key, but may also provide increased security. An exemplary method 800 for controlling a locking device 400 using a wireless translator 200 is illustrated in FIG. 2. The method 800 may be performed, for example, using the exemplary wireless translator 200 shown in FIG. 1. The method 800 includes step 810 for receiving, at a wireless receiver 210 of the wireless translator 200, access credentials and a lock command for the locking device from the mobile device 100 via a first wireless signal 101. The method 800 includes step 820 for verifying the access credentials in a processor 210 of the wireless translator 200. The method 800 includes step 830 for transmitting a lock command from the wireless translator 200 to the home automation system 300 via a second wireless signal 201 (if the access credentials are verified). The home automation system 300 is paired with the locking device 400. The method 800 includes step 830 for transmitting the lock command from the home automation system 300 to the locking device via a third wireless signal 301. As described above, the wireless translator 200 may be viewed as a separate piece of hardware from the locking device 400 and the home automation system 300 (i.e., located remotely from the locking device 400 and the home automation system 300).

Although described above that the wireless translator 200 may be a localized processing device (similar to existing keyboxes today), in certain instances the processing may be cloud-based (and operated as a service). For example, the on-site device (installed at the home for sale) may be configured as a Bluetooth beacon instead of being visually similar to a traditional lockbox (as depicted in FIG. 1). Operationally, when the user (e.g., real estate agent, etc.) comes within range of the local beacon device, the app on the mobile device 100 may detect the beacon device, which may give the user the option of 'opening' the home; however, instead of communicating locally to a physical wireless translator 200, the mobile device 100 (i.e. through the app) may communicate to the cloud to the translator service operating in the cloud. After authenticating to the service, the lock command may be given based on which local beacon device the mobile device 100 is in communication with. It should be appreciated that the local beacon device may transmit a beacon identifier (e.g., consisting of a unique numeric or alphanumeric code) to enable the mobile device 100 to inform the cloud-based translator service which home automation system 300 should be sent a command (i.e., the lock command, etc.). This lock command may be routed from the cloud (i.e., the cloud-based translator 200) to the home automation system 300 via the internet. The home automation system 300 may then tell the locking device 400 to unlock (e.g., by transmitting a lock command, as described above). The mapping of which home automation system 300 is tied to which local beacon device may be stored in the cloud. It should be appreciated that rights to the command particular home automation systems 300 may be controlled/managed by a governing body for a multiple listing service and/or the homeowner, similar to the way in which the management of rights is described above.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A wireless translator configured for communication with a plurality of home automation systems, the home automation systems configured to control locking devices, the wireless translator comprising:
    a wireless receiver configured to receive at least one wireless signal from a mobile device;
    a processor connected to the wireless receiver; and
    a memory system comprising one or more computer-readable media, wherein the computer-readable media comprise instructions that, when executed by the processor, cause the wireless translator to perform operations comprising:
    pairing with one of the plurality of home automation systems, the plurality of home automation systems differing from one another by at least one of operating system and communication protocol;
    receiving access credentials and a lock command from the mobile device;
    verifying the access credentials; and
    in response to verifying the access credentials, transmitting a lock signal to the paired home automation system,
    wherein the wireless translator is separate from the paired home automation systems, and located remotely from the paired home automation system.

2. The wireless translator of claim 1, further configured to receive the access credentials and the lock command as a first wireless signal transmitted using at least one of: Bluetooth, Bluetooth Low Energy (BLE), infrared, and near-field communication.

3. The wireless translator of claim 1, wherein the access credentials and lock command are received via a first communications protocol, and the lock signal is transmitted using a second communications protocol.

4. The wireless translator of claim 1, wherein:
    the paired home automation system is configured to receive the lock signal;
    the paired home automation system is further paired with a locking device; and
    the paired home automation system is configured to transmit a lock request to the locking device in response to receiving the lock signal.

5. The wireless translator of claim 4, wherein the locking device is configured to actuate from a locked position to an unlocked position in response to receiving the lock request.

6. The wireless translator of claim 4, wherein the lock request is transmitted using an audio voice recording stored on the memory system.

7. The wireless translator of claim 6, further comprising at least one speaker operably connected to the processor, the processor configured to cause the audio voice recording to be audibly transmitted via the at least one speaker as the lock request in response to verification of the access credentials.

8. The wireless translator of claim 4, wherein:
    the paired home automation system is further paired with an alarm panel; and
    the paired home automation system configured to transmit a deactivation signal to the alarm panel in response to receiving the lock signal.

9. The wireless translator of claim 8, wherein the alarm panel is configured to switch from an activated mode to a deactivated mode in response to receiving the deactivation signal.

10. The wireless translator of claim 8, wherein the deactivation signal is transmitted over at least one of: a wireless personal area network (WPAN), Wi-Fi, Zigbee, LoRaWAN, 5G, Cellular, Sub-gigahertz, and ultra-wideband.

11. The wireless translator of claim 1, further comprising a compartment for storing a key to the locking device, the compartment operably coupled with a lock actuator, the lock actuator operably coupled with the processor, the lock actuator configured to release the compartment in response to verification of the access credentials.

12. The wireless translator of claim 11, wherein the lock signal transmitted to the paired home automation system causes the paired home automation system to deactivate an alarm.

13. A method for using a wireless translator, the wireless translator capable of communicating with a plurality of home automation systems, the method comprising:
    pairing the wireless translator with one of the plurality of home automation systems;
    receiving, at a wireless receiver of the wireless translator, access credentials and a lock command from the mobile device;
    verifying the access credentials in a processor of the wireless translator; and
    transmitting a lock signal from the wireless translator to the paired home automation system;
    wherein the wireless translator is separate from the paired home automation system and located remotely from the paired home automation system.

14. The method of claim 13, wherein the paired home automation system is paired with a locking device; and the method further includes transmitting a lock request from the home automation system to the locking device in response to the wireless translator transmitting the lock signal to the paired home automation system.

15. The method of claim 13, wherein the step of transmitting the lock signal from the wireless translator to the paired home automation system comprises audibly transmitting an audible signal via at least one speaker of the wireless translator to the home automation system in response to verification of the access credentials.

16. The method of claim 13, wherein the home automation system is further paired with an alarm panel, the home automation system configured to transmit a deactivation signal to the alarm panel response to receiving the lock signal.

17. A system comprising:
    an application stored on and operable by a mobile device;

a wireless translator configured for communication with a plurality of home automation systems and with the mobile device, the wireless translator comprising:

a wireless receiver configured to receive at least one wireless signal from a mobile device;

a processor connected to the wireless receiver; and a memory system comprising one or more computer-readable media, a paired home automation system that is paired with the wireless translator;

wherein the application is configured to cause the mobile device to transmit access credentials and a lock command to the wireless translator;

wherein the computer-readable media comprise instructions that, when executed by the processor, cause the wireless translator to perform operations comprising:

receiving access credentials and a lock command from the mobile device;

verifying the access credentials; and in response to verifying the access credentials, transmitting a lock signal to the paired home automation system;

wherein the wireless translator is separate from and located remotely from the paired home automation system.

18. The system of claim 17, wherein the paired home automation system is configured to:

control a locking device; and receive the lock signal from the wireless translator and, in response, transmit a lock request to the locking device, thereby causing the locking device to actuate from a locked position to an unlocked position in response to receiving the lock command.

19. The system of claim 17, wherein the access credentials and lock command are transmitted and received via a first communications protocol, and the lock signal is transmitted and received using a second communications protocol.

20. The system of claim 17, wherein the wireless translator includes a compartment for storing a key for accessing a home, the compartment operably coupled with a lock actuator, the lock actuator operably coupled with the processor, the lock actuator configured to release the compartment when the access credentials are verified, wherein the paired home automation system responds to the lock signal by deactivating an alarm.

* * * * *